United States Patent
Lindner et al.

(10) Patent No.: US 10,035,151 B2
(45) Date of Patent: Jul. 31, 2018

(54) DEVICE WITH BAFFLE CHAMBER

(71) Applicant: Manuel Lindner, Spittal/Drau (AT)

(72) Inventors: Manuel Lindner, Spittal/Drau (AT); Mario Fritz, Spittal/Drau (AT); Peter Schiffer, Spittal/Drau (AT); Michael Maier, Spittal/Drau (AT)

(73) Assignee: Manuel Lindner, Spittal/Drau (AT)

( * ) Notice: Subject to any disclaimer, the term of this patent is extended or adjusted under 35 U.S.C. 154(b) by 294 days.

(21) Appl. No.: 14/702,339

(22) Filed: May 1, 2015

(65) Prior Publication Data
US 2015/0314296 A1    Nov. 5, 2015

(30) Foreign Application Priority Data

May 2, 2014   (EP) .................. 14 166 835

(51) Int. Cl.
| | |
|---|---|
| B02C 23/00 | (2006.01) |
| B02C 23/02 | (2006.01) |
| B02C 7/08 | (2006.01) |
| B23P 6/00 | (2006.01) |
| B02C 13/282 | (2006.01) |
| B02C 18/08 | (2006.01) |
| B02C 13/14 | (2006.01) |
| B02C 18/16 | (2006.01) |
| B02C 13/286 | (2006.01) |

(52) U.S. Cl.
CPC ............... *B02C 23/02* (2013.01); *B02C 7/08* (2013.01); *B02C 13/14* (2013.01); *B02C 13/282* (2013.01); *B02C 18/08* (2013.01); *B02C 23/00* (2013.01); *B23P 6/00* (2013.01); *B02C 2013/28609* (2013.01); *B02C 2013/28618* (2013.01); *B02C 2018/162* (2013.01); *Y10T 29/49719* (2015.01)

(58) Field of Classification Search
CPC ........... B02C 7/08; B02C 13/14; B02C 23/02; B02C 2013/28618; B02C 2013/28609; B23P 6/00; Y10T 29/49719
See application file for complete search history.

(56) References Cited

U.S. PATENT DOCUMENTS

| | | | | |
|---|---|---|---|---|
| 3,860,184 A | * | 1/1975 | Acton ................... | B02C 13/286 241/275 |
| 4,690,341 A | * | 9/1987 | Hise .................... | B02C 13/1842 241/275 |
| 5,114,084 A | * | 5/1992 | Yamaguchi ............. | B02C 17/24 241/178 |
| 5,782,677 A | * | 7/1998 | Kanouse ............... | B24B 31/023 241/182 |

(Continued)

FOREIGN PATENT DOCUMENTS

WO    WO 2004/024331 A1    3/2004

OTHER PUBLICATIONS

European Patent Office. European Search Report dated Jan. 20, 2015. European Application No. EP 14 16 6835. Name of Applicant: Manual Lindner. German Language. 6 pages.

*Primary Examiner* — Faye Francis

(74) *Attorney, Agent, or Firm* — Moore & Van Allen PLLC; Henry B. Ward, III

(57) ABSTRACT

A device for shredding material is provided. The device includes a baffle chamber with a discharge opening and a rotor shaft having a longitudinal axis and provided in the baffle chamber, where the baffle chamber is rotatable about the longitudinal axis of the rotor shaft.

3 Claims, 2 Drawing Sheets

(56) References Cited

U.S. PATENT DOCUMENTS

| | | | | |
|---|---|---|---|---|
| 5,794,865 | A * | 8/1998 | Didion | B22C 5/0459 |
| | | | | 164/404 |
| 7,775,468 | B2 * | 8/2010 | Bednarski | B02C 13/282 |
| | | | | 241/188.1 |
| 2008/0277515 | A1 | 11/2008 | Bednarski et al. | |
| 2012/0018557 | A1 * | 1/2012 | Hubrich | B02C 21/026 |
| | | | | 241/101.71 |

* cited by examiner

DEVICE WITH BAFFLE CHAMBER

FIELD OF THE INVENTION

The present invention relates to a shredding device or a recycling device, respectively, for shredding or recycling material, in particular in the form of waste products and in particular to such a device with a baffle chamber.

PRIOR ART

Machines with vertical shafts (rotor shafts) and tools attached thereto are frequently used as shredding and recycling machines for waste (commercial waste, industrial waste, electronic scrap, metal scrap, plastic, composites, rubber, wood, etc.) and substrates (renewable raw materials, biomass, etc.). The tools can comprise, for example, movably arranged baffle plates and breaking hammers or also chains. They are loaded, for example, by wheel loaders, forklifts, conveyors or conveying screws via a hopper for receiving material. After shredding, the material is discharged and transported onward by use of a conveyor belt, a conveyor screw, a chain conveyor or an extraction system, etc.

The machines comprise machine housings with a mounted drive and with a support of the rotor shaft. The rotor shaft is enclosed by a round or approximately round (cylindrical or polygonal) baffle chamber with a vertical axial direction in which the shredding process takes place. The baffle chamber is rigidly connected to the machine housing and has a drop-in and an ejection opening (discharge opening) at fixedly defined positions. Loading is effected via a drop-in chute fixedly screwed or bolted on, via which the material to be processed passes through the drop-in opening into the baffle chamber. The supply of material to be shredded into the baffle chamber and in particular the discharge of the shredded material into a collecting or conveying device can occur only in a very fixedly stationary manner according to the predetermined fixed machine configuration.

It is therefore in view of the above-mentioned problems an object of the present invention to provide an improved shredding or recycling device, respectively, in which the discharge of shredded material is enabled more flexible as compared to known prior art.

DESCRIPTION

The above object is satisfied by a device according to claim 1, i.e. a device for shredding or recycling material or separating material compounds comprising a baffle room (baffle chamber) including a discharge opening (ejection opening). The discharge opening can be located in a wall of the baffle chamber having, for example, a cylindrical shape. According to a further example, the discharge opening can be located (non-central) in the base of the baffle chamber. A rotor shaft with a longitudinal axis is provided in the baffle chamber. The longitudinal axis is, for example, substantially perpendicular to a surface on which the device is disposed (vertical shredder). The baffle chamber is rotatable about the longitudinal axis of the rotor shaft. A support with shredding tools, in particular baffle plates and possibly breaking hammer tools disposed thereabove for coarse pre-shredding, can be attached to the rotor shaft. Where shredding, shredding device, shredding tools, etc. are presently and hereinafter mentioned, then these terms always comprise the recycling of organic materials (biomass) for further processing, i.e. in particular increasing the surface of the material processed in the device for a better gas balance in a biogas plant in which the material is subsequently used, and also the separation of material compounds (such as plastic and metal or different metals).

The device can be a baffle shredder/impact crusher which is designed in particular for shredding inorganic or organic waste products. The material to be shredded can in particular be waste (commercial waste, industrial waste, electronic scrap, metal scrap, plastic, composite materials, rubber, wood). It can be in particular renewable raw materials, energy crops, maize and grass silage, turnips and tubers, green waste and feed residues, straw and leaves, landscaping material, manure from livestock farming, expired food, slaughterhouse waste, slurry and chicken droppings. The device can weigh several tons, for example, more than 1 ton, in particular more than 3 tons, and have dimensions of more than a meter or several meters in length, width and height. The device can be operated continuously or in batch operation.

Due to the fact that the baffle chamber is rotatable, the position of the discharge opening can in contrast to prior art be varied. First material can be shredded and at a first ejection position be passed through the discharge opening to a first collecting device or transport device, and then second material differing from the first material can be shredded and at a second ejection position differing from the first be passed through the discharge opening to a second collecting device or transport device differing from the first. The flexibility of processing different materials is increased in a desirable manner over prior art.

Due to the wear occurring in the course of operation of the machine, servicing activities are to be performed within the machine (baffle chamber). Due to the rigid machine constructions and the direct connections at the transfer points for receiving the material to be processed and the discharge of the processed material, servicing access is in prior art very difficult and enabled only in an ergonomically unfavorable manner. In the device according to the invention, the additional advantage is provided by the rotatable baffle chamber that servicing is greatly simplified.

The baffle chamber can in particular have a service door and the position (rotational position) of the service door can be changed by the rotatability of the baffle chamber. Depending on local and structural conditions that are given for the device set-up in practice, a position of the service door can be found by a corresponding rotation of the baffle chamber in which the service door can be opened freely, enabling more comfortable access to the baffle chamber for servicing same or the tools etc. mounted therein, respectively.

Said baffle chamber can comprise a wall extending parallel to the longitudinal axis of the rotor shaft or the baffle chamber, respectively, so that the service door is provided in this wall. Opening the service door therefore presently means opening part of the wall. The baffle chamber can be configured to be cylindrical or polygonal in shape. The baffle chamber can in the device according to the invention in particular be mounted on a support device as part of a machine housing, and in particular be rotatable relative to the latter. The rotation can occur, for example, along a rotating assembly which is mounted on the support device and on which the baffle chamber is supported.

According to one development, the service door comprises a discharge opening for discharging the material shredded in the baffle chamber. The discharge opening can be the above-mentioned discharge opening of the baffle chamber. The device can additionally generally comprise a discharge push device which is configured to partially or completely close the discharge opening. By partially closing the discharge opening, for example, the size of the shredded discharged material can be adjusted during continuous operation. A strainer with different punched holes can be placed in the discharge opening or its region in order to classify the size of the discharged material. During batch operation, the discharge opening is closed by the discharge push device until termination of the shredding process and is then opened to discharge the shredded material.

Due to the fact that it is provided rotatably, the baffle chamber can in all the above-described examples be rotated from an operating position in which the material can be shredded to a service position in which, for example, the baffle chamber is accessible after opening a service door provided therein. The baffle chamber can in particular be rotated from a first operating position in which the material can be shredded to a second operating position which is different from the first operating position and in which the material or further material can be shredded. The respectively shredded material can then be discharged through the discharge opening in the various operating positions to respective different and optionally fixedly disposed collecting or conveying devices. Particular material can thereby be shredded and discharged at a specific rotational position of the baffle chamber and thereby at the discharge opening. Thereafter, further material can be shredded and discharged at a different rotational position of the baffle chamber and thereby at the discharge opening. The flexibility of successive shredding of different materials is significantly increased over prior art with the baffle chamber fixedly mounted in the machine construction.

In all the examples described above, the baffle chamber can have a drop-in opening (inlet opening) for introducing the material to be shredded, where this drop-in opening can be disposed in a two-dimensional plane parallel to the longitudinal axis of the rotor shaft (therefore laterally). It can also be arranged in a plane with a certain finite (non-zero) angle relative to the plane parallel to the longitudinal axis (for example perpendicular thereto). The drop-in opening can in particular be disposed non-centrally relative to the longitudinal axis of the rotor shaft, i.e. the center of the drop-in opening can relative to the longitudinal axis have a spatial offset in a plane perpendicular to the longitudinal axis. This makes it possible that the drop-in opening can during a rotation of the baffle chamber be rotated from a first position for receiving material to a second position for receiving further material. Not only different flows of shredded material can thereby—as described above—be discharged at different operating positions, but also different flows of material to be shredded can be received in the baffle chamber at different operating positions. Flows of different materials can therefore by the device according to the invention be flexibly processed completely separated from each other.

Furthermore, the use of the device according to one of the preceding claims for recycling a substrate, for example, for biogas plants and a method for recycling such a substrate by use of this device is provided, where the use (method) comprises:

introducing first material into the baffle chamber;
shredding the first material in the baffle chamber;
discharging the shredded first material in a first operating position (in which, for example, also the first material is shredded);

rotating the baffle chamber to a second operating position differing from the first operating position;
introducing second material into the baffle chamber after the shredded first material has been discharged, where the introduction can occur, for example, in the first or at the second operating position;
shredding the second material in the baffle chamber, for example, in the second operating position;
discharging the shredded second material in the second operating position.

The first material can there in the first operating position be introduced through an inlet opening of the baffle chamber into the baffle chamber and the second material can in the second operating position be introduced through the inlet opening into the baffle chamber, where the inlet opening can be disposed in a plane perpendicular to the longitudinal axis of a rotor shaft positioned perpendicular into the baffle chamber and being disposed non-centrally relative to said longitudinal axis of the rotor shaft (i.e., the center of the inlet opening relative to the longitudinal axis has a spatial offset in the plane perpendicular to the longitudinal axis). First material to be shredded can thereby in a first operating position be supplied, shredded and discharged and second material to be shredded differing therefrom can in the second operating position (i.e. with the entry opening offset relative to the first operating position) be supplied, shredded and discharged, so that two different material flows can be sequentially processed separately.

In addition, a method for servicing a device for shredding material is provided, where the device comprises a baffle chamber with a service door and a rotor shaft positioned in the baffle chamber and having a longitudinal axis, where the baffle chamber is rotatable about the longitudinal axis of the rotor shaft, comprising the steps of rotating the baffle chamber from an operating position, in which the material can be shredded and/or shredded material can be discharged, to a service position;
opening the service door in the service position; and
servicing the baffle chamber or tools located therein after the service door has been opened in the service position. A servicing person can continue performing a rotation of the baffle chamber until the service door is at a (rotational) position at which the service door can be opened wide. This makes servicing easily possible through a service opening made accessible by opening the service door in the service position.

Further features and exemplary embodiments of the present invention are illustrated in more detail below using the drawings. It is understood that the embodiments do not exhaust the scope of the present invention. It is further understood that some or all features described hereafter can also be combined with each other in different ways.

Figure 1A:
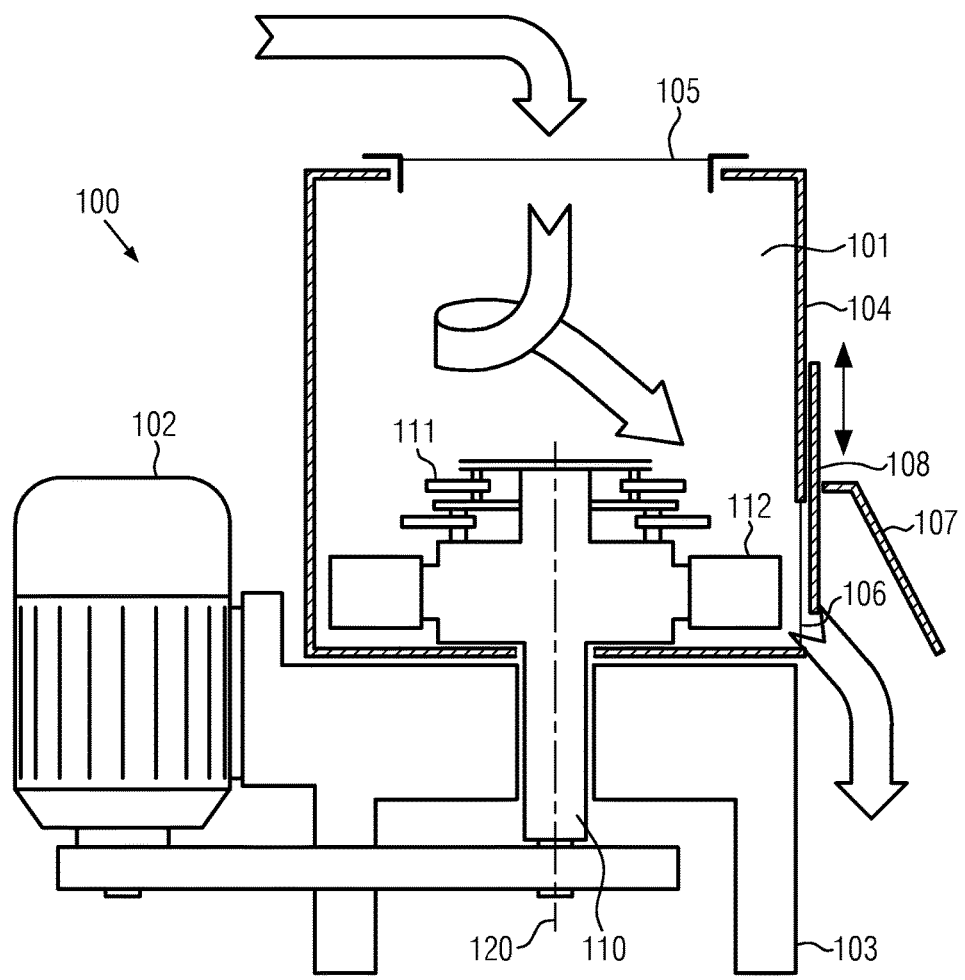
FIGS. 1a and 1b illustrate a device with a rotatable baffle chamber with a service door according to one embodiment of the present invention in a cross-sectional view and a plan view.
Figure 1B:
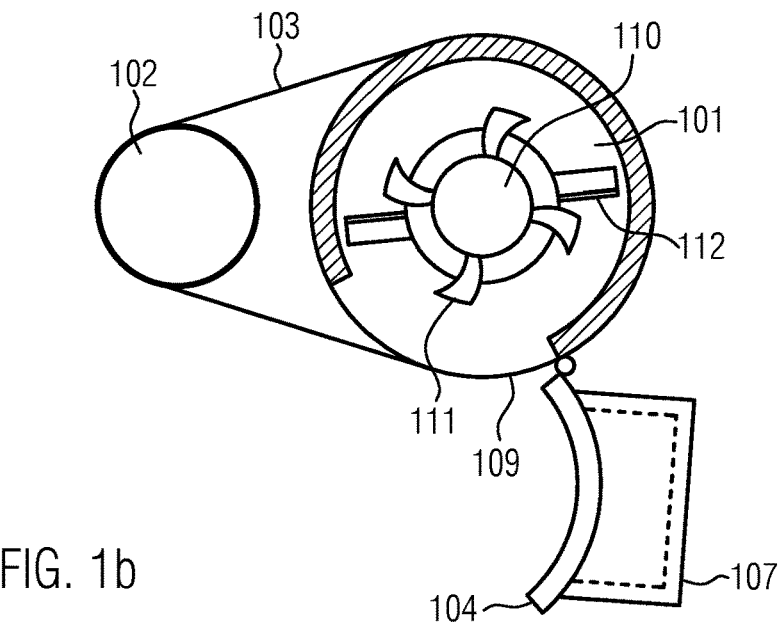

As shown in FIGS. 1a and 1b, device 100 according to the invention by way of example comprises a baffle chamber 101 rotatable about its longitudinal axis. A rotor shaft 110 is positioned in the baffle chamber 1 by use of which its tools 111, 112 are moved to shred material introduced into the baffle chamber. Baffle tools can be provided on a vertically mounted multi-element carrier, where the baffle tools can comprise multi-tools 111, breaking hammers arranged in two rows for coarse pre-breaking, and rotatably mounted baffle plates 112.

Baffle chamber 101 is rotatable about longitudinal axis 120 of rotor shaft 110. Rotor shaft 110 is driven by a drive (motor) 102. Baffle chamber 101 can be rotated manually or by use of an additional motor on a rotating assembly. In the example shown in FIGS. 1a and 1b, the rotating assembly and thus baffle chamber 101 mounted thereon is attached to a support device 103 as part of a machine housing. Baffle chamber 101 can therefore be rotated relative to support device 103 and thereby relative to the machine housing.

Device 100 illustrated can in particular be an impact crusher which is usable, for example, for shredding/recycling organic waste materials. The impact crusher can be employed, for example, for recycling organic waste materials for biogas plants. The organic materials can be in particular renewable raw materials, energy crops, maize and grass silage, turnips and tubers, green waste and feed residues, straw and leaves, landscaping material, manure from livestock farming, expired food, slaughterhouse waste, slurry and chicken droppings. The impact crusher can weigh about 6 tons and be dimensioned at about 2.5 m in width, length and height. The diameter and the height of the, for example, cylindrical baffle chamber 101 can be about 1 meter. The drive power of motor 102 can be at about 80 kW to provide a rotational speed of the rotor shaft of about 1000 revolutions per minute. A control device can be provided for changing the rotational speed, for example, in dependence of the composition of the material to be shredded. Device 100 thus configured allows a throughput of material to be shredded of about 1 to 8 tons and more per hour.

Baffle chamber 101 comprises a service door 104. In the rotational position shown in FIG. 1a, service door 104 is disposed across from motor 102. In FIG. 1b, service door 104 is shown in the open state The position shown in FIG. 1a can be an operating position in which a shredding operation takes place. In the operating position, receiving material to be shredded and discharging shredded material can occur in addition to the material shredding. Material flows are in FIG. 1a illustrated by arrows. The position shown in FIG. 1b can be a service position in which baffle chamber 101 is accessible for a servicing person via opened service door 104 through a service opening 109 made accessible by opened service door 104.

Baffle chamber 101 comprises a drop-in opening (entry opening) 105 at the top, into which the material to be shredded in device 100 can be filled in via a drop-in hopper, not shown. Such a drop-in hopper can be attached at drop-in opening 105. In the example shown in FIGS. 1a and 1b, service door 104 comprises a discharge opening 106 for discharging the material shredded in the baffle chamber. Discharge opening 106 transitions into an outlet hopper element 107. It can be closed completely or partially by a discharge pusher 108. Discharge pusher 108 can be adjusted steplessly by use of a spindle-type lifting gear or a hydraulically actuated cylinder. A strainer with different punched holes can be placed in discharge opening 108 or its region in order to classify the size of the discharged material.

While discharge opening 106 is in FIGS. 1a and 1b provided in the service door 104, it can alternatively be provided in the wall of baffle chamber 101 outside service door 104 or in the base disposed laterally relative to rotor shaft 110. The baffle chamber can also in one embodiment comprise no service door, and discharge opening 106 can be provided in the wall or in the base of the baffle chamber.

In batch operation, discharge opening 108 is during the shredding process completely closed and discharge pusher 108 (or discharge opening 106) completely opened for discharging shredded material. In continuous operation, discharge opening 108 is during the shredding process partially opened according to the desired size of the shredded material. The shredded material is via output hopper element 107 supplied to a collection or removal device.

Figure 2:
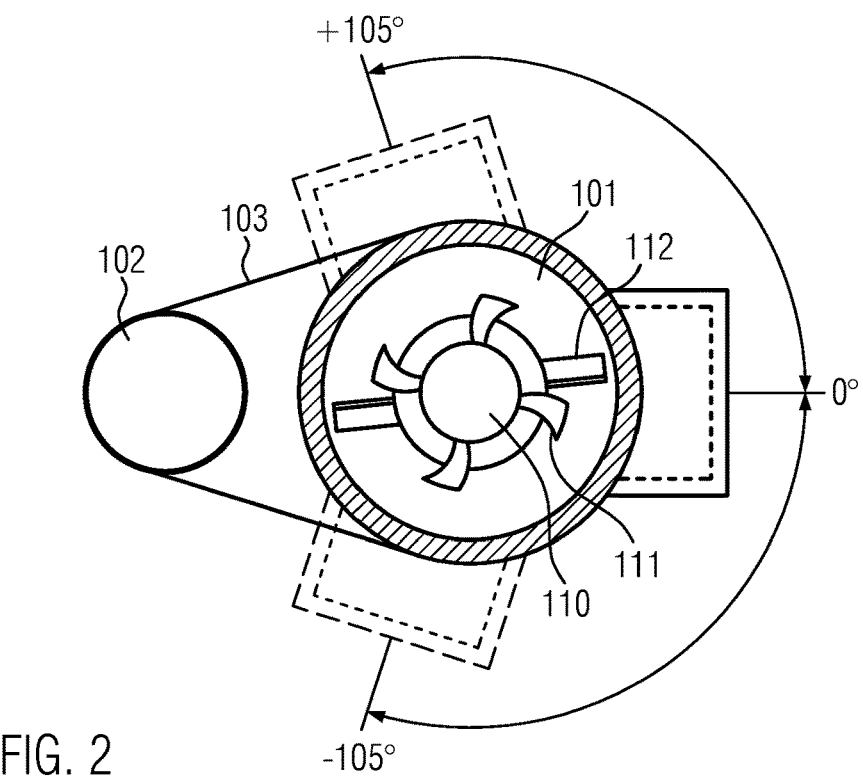
FIG. 2 shows a plan view of one example of the device according to the invention with a rotatable baffle chamber and various rotational positions of the device.

As shown in FIG. 2, for example, three rotational positions can be distinguished for baffle chamber 101. In position a, discharge opening 106 or output hopper element 107, respectively, is positioned across from motor 102. A straight line can therefore be drawn running centrally through the motor and through output hopper element 107. This position a can be a first operating position in which first material is introduced into the baffle chamber and shredded there. After shredding, it is discharged, for example, at the same position a via outlet hopper element 107.

After discharging the shredded material at position a and closing the discharge opening with discharge pusher 108 (see FIG. 1a), second material can be introduced at the same position into baffle chamber 101 and shredded there. After the second material is shredded, it can by rotating baffle chamber 101 to position a be discharged via output hopper element 107. Normally, however, baffle chamber 101 is after discharging the shredded material at position a rotated to position b to receive the second material to be shredded. In the example shown, position b is reached by rotating baffle chamber 101 counterclockwise about its longitudinal axis (longitudinal axis 120 of rotor shaft 110 in baffle chamber 101; see FIG. 1a) from position a by 105°. With a different design of the drive by the motor, the ejection position of the shredded material can be varied in the range of 360°.

Shredding the second material can therefore alternatively occur at position b or also at a different position. Also the introduction of the second material to be shredded can alternatively occur at position b or also at a different position. The first material can differ from the second material. It is therefore enabled in particular by the invention that different material is subsequently shredded in baffle chamber 101 and after shredding is discharged at different optionally stationarily fixed collecting or conveying devices at different rotational positions of baffle chamber 101 and therefore of discharge opening 106.

In one embodiment, drop-in opening 105 shown in FIG. 1a is provided non-centrally offset relative to longitudinal axis 120 of rotor shaft 110 (i.e. laterally offset therefrom). For example, the first material to be shredded can at operating position a by a first, for example, stationary conveyor (a first conveying screw) be guided through the drop-in opening 105, appropriately positioned for receiving material, into baffle chamber 101, while the second material to be shredded can at operating position b by a second, for example, stationary conveyor (a second conveying screw), be guided through drop-in opening 105, appropriately positioned for receiving material, into baffle chamber 101. Together with different collecting or conveying devices at positions a and b, different material flows can thereby be successively processed in a highly efficient manner with one and the same device 100 for shredding materials.

A third position c (similar to position 1b shown in FIG. 1b) is shown in FIG. 2. Position c can be reached by clockwise rotation of baffle chamber 101 about its longitudinal axis (longitudinal axis 120 of rotor shaft 110 in baffle chamber 101; see FIG. 1a) from position a by 105° or from position b by 210°, respectively For example, position c, as shown in FIG. 2, is a third operating position. By rotating baffle chamber 101, material to be shredded can therefore be received, and shredded material discharged at the three positions a, b and c shown. Position c can alternatively be a service position in which the service door of baffle chamber 101 can be opened without obstruction (see FIG. 1*b*) so that baffle chamber 101 can be made easily accessible for a servicing person in position c in that service opening 109 is made accessible by the opened service door. Servicing can therefore be significantly simplified over prior art in which the baffle chamber is installed stationarily in the overall machine structure. Baffle chamber 101 can in particular, depending on available installation room or other local structural secondary conditions, be rotated to a position c in which enough space is made available for opening service door 104 wide.

A servicing person can thereby obtain easy access to baffle chamber 101 to be serviced or tools 111, 112 etc. located therein.

While FIG. 2 shows three operating positions a, b and c, it is understood that in principle any number of operating and service positions selectable by the user can be provided. The angular distance (see FIG. 2) from one position to the next position can in principle similarly be freely chosen.

What is claimed is:

1. Use of a device for shredding material, comprising providing the device for shredding the material, wherein the device comprises a baffle chamber with a discharge opening and a rotor shaft having a longitudinal axis and provided in said baffle chamber, where said baffle chamber is rotatable about said longitudinal axis of said rotor shaft, where said baffle chamber is rotatable from a first operating position, in which said material can be shredded, to a second operating position, which differs from said first operating position and in which said material or further material can be shredded, the use further comprising:

providing one of a first collecting device and a first conveying device at the first operating position;
providing one of a second collecting device and a second conveying device at the second operating position;
introducing a first material into said baffle chamber;
shredding said first material in said baffle chamber;
discharging said shredded first material in the first operating position (a) to said one of the first collecting device and the first conveying device thereby providing a first material flow;
rotating said baffle chamber to the second operating position (b) differing from said first operating position (a);
introducing a second material into said baffle chamber after said shredded first material has been discharged;
shredding said second material in said baffle chamber; and
discharging said shredded second material in said second operating position (b) to said one of the second collecting device and the second conveying device thereby providing a second material flow that is different from the first material flow.

2. The use of said device according to claim 1 with which said first material is in said first operating position (a) introduced through an inlet opening of said baffle chamber into said baffle chamber, and said second material is in said second operating position (b) introduced through said inlet opening into said baffle chamber.

3. The use of said device according to claim 1, wherein the baffle chamber comprises a service door and further comprising, after discharging said second material in said second operating position, rotating said baffle chamber from the second operating position to a service position wherein the baffle chamber is accessible after opening of the service door.

* * * * *